Nov. 12, 1946.  G. T. BURRELL  2,410,925
CAMERA OPERATING CONTROL
Filed July 26, 1943
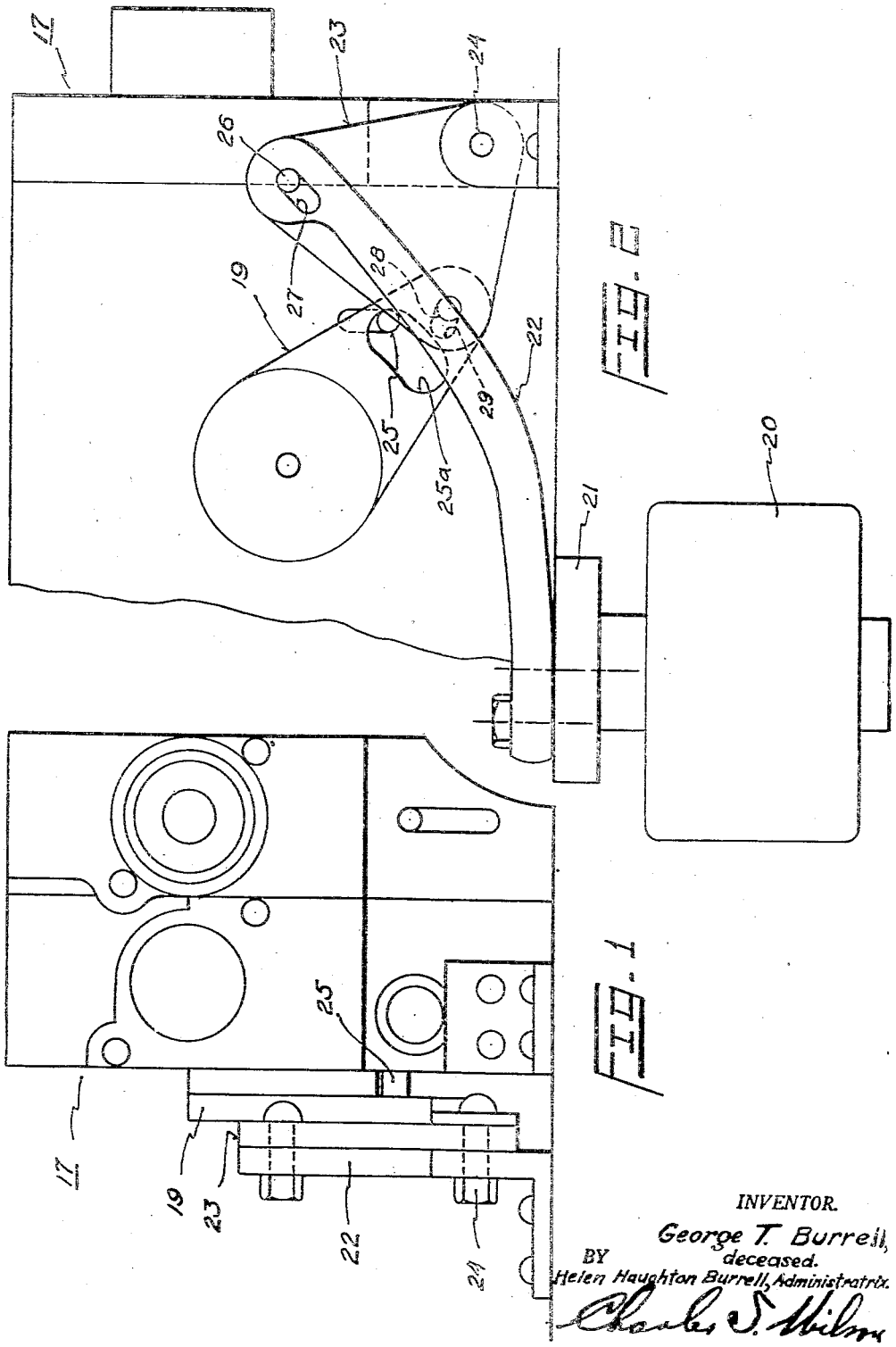
INVENTOR.
George T. Burrell,
deceased.
BY
Helen Haughton Burrell, Administratrix.

Patented Nov. 12, 1946

2,410,925

UNITED STATES PATENT OFFICE 2,410,925

CAMERA OPERATING CONTROL

George T. Burrell, deceased, late of Huntington Station, N. Y., by Helen Haughton Burrell, administratrix, Huntington Station, N. Y., assignor to Republic Aviation Corporation, a corporation of Delaware Application July 26, 1943, Serial No. 496,103

6 Claims. (Cl. 88—16)

This invention relates to improvements in photographic apparatus, and more particularly to a camera operating control mechanism for successively exposing the individual frames of a photographic film.

This application is a continuation in part of the application of George T. Burrell, filed July 12, 1941, Serial No. 402,069, and which matured into Patent No. 2,378,182 on June 12, 1945.

The original application, of which this is a continuation in part, contemplates an apparatus that periodically and continuously photographs a flight test instrument panel during a test flight without any intervention on the part of the pilot of the aircraft beyond initially starting the operation of the apparatus. Such apparatus includes a constantly effective source of power, and the present invention has in view an operating control that will utilize the power of said constantly effective source to cause a periodic and successive exposure of the frames of a photographic film in the camera forming a part of the apparatus of the aforesaid parent application.

Photographic apparatus to which the improvements of this invention relate usually comprise a main spring which furnishes the power to drive the film-release mechanism, and a lever or other suitable means for effecting exposure of the film, one frame at a time. Heretofore, it has been necessary to rewind the main spring manually after the roll of film, or a substantial part thereof, has been exposed, in order to prepare the camera for exposing the next roll of film.

One of the objects of the invention is to provide photographic apparatus wherein the main spring will be rewound automatically as it functions to operate or drive the film-release mechanism, and at a rate, or in an amount, substantially sufficient to restore to the spring the energy expended in releasing the film, so that the camera will be in the same condition, in this respect, at the end of the "run" as it was at the beginning.

Other objects and advantages will hereinafter appear.

For the purpose of illustrating the invention, an embodiment thereof is shown in the drawing, wherein Figure 1 is a front elevation, looking toward the left in Figure 2; and Figure 2 is a side elevation, looking toward the right in Figure 1 illustrating the positions occupied by the parts of the instant invention after a single exposure by the camera.

The reference numeral 17 designates, generally, a moving-picture or other suitable type of camera of standard construction, and having release mechanism (not shown) of a conventional type for exposing the film. The operating action of this mechanism is controlled by a release member in the form of a stud 25, the arrangement being such that upon each downward movement of the stud, one frame of the film is exposed.

The usual main spring (not shown) is rewound by clockwise rotary movement of a crank 19. This crank is provided with a slot 25a which receives the stud 25. Upon clockwise rotary movement of crank 19, the upper edge and end of slot 25a engages stud 25, to push it down and accordingly effect release and exposure of one frame of the film. Return movement of crank 19 in the counter-clockwise direction permits stud 25 to return to its initial position, where it again becomes effective, when pushed down as before, to release the next or succeeding frame of the film.

A rotary oscillatory movement may be imparted to crank 19 by any suitable means. As shown in the drawing, such means may comprise a triangular plate 23 pivoted at 24. This plate is caused to periodically oscillate upon and from the continuous operation of an electric motor 20 having a driving connection therewith through a slotted connecting rod 22 and an eccentric 21.

It is contemplated by the invention that any required play may be provided for by using a universal or swivel joint to connect the rod 22 with eccentric 21, and by having a sufficient amount of play about the pin 26, fixed in plate 23, with respect to the edges of the slot 27 in rod 22. The throw of eccentric 21 is greater than the length of slot 27 by an amount sufficient to make the driving connection through rod 22 effective. For example, in the other extreme position of eccentric 21, that is, one hundred and eighty degrees from the position shown in Fig. 2, the lower end of slot 27 will be in engagement with the pin 26, and plate 23 will be raised, crank 19 will be in its extreme position in the counter-clockwise direction, and the stud 25 will be in its upper, initial position ready to effect release of the next frame. A pin 28, fixed in plate 23, has a sliding fit in a slot 29 with which crank 19 is provided. By such means, the crank 19 is caused to oscillate upon and from oscillatory movement of plate 23.

With the parts in the positions just described, i. e. disposed at the opposite ends of the respective paths of movement to the positions illustrated in Fig. 2, the continued movement of the eccentric 21 will cause the rod 22 to move downwardly on the pin 26 until the latter contacts the upper end of the slot 27. Whereupon a pull is exerted by the rod on the pin 26 which swings the plate 23 about its pivot 24 thereby moving the crank 19 in a clock-wise direction which movement causes the stud 25 to be moved downwardly exposing one frame of the film in the camera 17. The motor 20 operates continuously and for every complete revolution thereof one frame of the film is exposed as above described. Manifestly therefore the tempo of the film exposure can be accurately controlled by regulating the speed of the motor 20. From the foregoing, it will be seen that the crank 19, which is common with respect to the single-frame release stud 25 and the main spring of the camera, is caused to oscillate at a rate equal to the rate of rotation of motor 20. For example, if the adjustment is such that motor 20 rotates at the rate of sixty revolutions a minute, the stud 25 will be pushed down to release and effect exposure of the film at the rate of one frame every second.

It will be understood that various changes, such as in the size, shape and arrangement of the parts, may be made without departing from the spirit of this invention or the scope of the claims.

Having thus disclosed the inventive concepts and one mode realizing the same, what is claimed as new and inventive is:

1. The combination with a spring driven motion picture camera having a mainspring and a single frame release mechanism, of a stud projecting from the camera for the control of the release mechanism, a crank for winding the mainspring of the camera having a slot therein coacting with the stud of the release mechanism, a triangular plate pivotally mounted at one of its vertices, a pin and slot connection between another vertex of said plate and the extremity of said crank, an operating rod, a pin and slot connection between one extremity of said operating rod and the third vertex of the plate, a constantly rotating motor, a disc on the shaft of said motor, and an eccentric connection between the opposite extremity of said rod and said disc, whereby the rotation of the latter through 180° swings the plate about its pivot in one direction to rotate the crank in a clockwise direction for rewinding the mainspring of the camera and for operating the aforesaid stud to trip the release mechanism and the continued rotation of the disc through the remaining 180° of a complete revolution thereof swings the plate about its pivot in the reverse direction to move the crank counter-clockwise and restore the stud to its initial position.

2. The combination with a spring driven motion picture camera having a main spring, a single frame release mechanism and a projecting stud for the operation of the latter, of an oscillatory crank connected to the main spring and having means engaging the stud for the simultaneous rewinding of the main spring and operation of the stud upon the clockwise movement of the crank, a constantly rotating power source, an eccentric rotating in unison with said power source, and a linkage between said eccentric and said crank for imparting one complete oscillation to the latter upon each revolution of the former.

3. The combination with a spring driven motion picture camera having a main spring, a single frame release mechanism and a projecting reciprocable stud for the operation of the release mechanism, of an oscillatory crank for rewinding the main spring by its movement in one direction and having means engaging the stud for controlling the reciprocable movement thereof simultaneously with the movement of the crank in either direction, a constantly rotating motor, a disc operating in unison with said motor, an operating rod eccentrically connected to said disc, and an intermediate oscillating member connected to the extremity of the operating rod and to the crank for imparting a full oscillation to the crank upon each revolution of the disc and motor aforesaid.

4. The combination with a spring driven motion picture camera having a main spring and a single frame release mechanism, of a stud protruding from the camera and reciprocable to control said release mechanism, an oscillatory crank for rewinding the main spring of the camera having means of cooperation with the stud aforesaid, whereby the movement of the crank in one direction to rewind the spring positively moves the stud to expose a single frame and the movement of the crank in the opposite direction allows the stud to return to its original position, a constantly rotating motor, a disk rotating in unison with said motor, a pivotally mounted plate, a pivotal connection between said plate and the extremity of said crank, and a connection between the disc aforesaid and the plate whereby each rotation of the disc causes an oscillation of the plate and a corresponding oscillation of the crank.

5. The combination with a camera having a single frame release mechanism and a protruding stud movable to control said release mechanism to expose a single frame, of a crank pivoted to the camera and having a slot coacting with the stud for controlling the operation thereof as the crank oscillates on its pivot, and means for oscillating the crank on its pivot comprising a plate mounted for oscillation on a fixed pivot and connected to the extremity of the crank, a constantly rotating motor, and an operating rod eccentrically pivoted to the shaft of the motor at one of its ends and to the plate at the other of its ends.

6. The combination with a camera having a single frame release mechanism and a protruding stud reciprocable to control said release mechanism to expose a single frame, of a crank mounted for oscillation on the camera and having a slot engaging the stud to control the movement thereof in both directions as the crank oscillates, and means for oscillating the crank comprising a triangular plate mounted for oscillation on a fixed pivot at one of its vertices and having a pin and slot connection with the extremity of the crank at another of its vertices, a constantly rotating motor, and an operating arm eccentrically pivoted to the shaft of the motor, at one of its ends and having a pin and slot connection at the other of its ends to the remaining vertex of said plate.

HELEN HAUGHTON BURRELL,
*Administratrix of the Estate of George T. Burrell, Deceased.*